(12) United States Patent
Pen

(10) Patent No.: US 7,813,963 B2
(45) Date of Patent: Oct. 12, 2010

(54) INTERACTIVE ELECTRONIC DESKTOP ACTION METHOD AND SYSTEM FOR EXECUTING A TRANSACTION

(76) Inventor: The Pen, 954 Palm Ave., #103, West Hollywood, CA (US) 90069

( * ) Notice: Subject to any disclaimer, the term of this patent is extended or adjusted under 35 U.S.C. 154(b) by 1172 days.

(21) Appl. No.: 11/318,657

(22) Filed: Dec. 27, 2005

(65) Prior Publication Data

US 2007/0150601 A1   Jun. 28, 2007

(51) Int. Cl.
 G06Q 30/00 (2006.01)
 G06F 13/00 (2006.01)
(52) U.S. Cl. .............................. 705/26; 725/37; 725/60; 705/27
(58) Field of Classification Search .................. 705/26, 705/27; 725/37, 52, 53, 60, 61
See application file for complete search history.

(56) References Cited

U.S. PATENT DOCUMENTS

| | | | |
|---|---|---|---|
| 5,668,591 A | 9/1997 | Shintani | |
| 5,819,034 A | 10/1998 | Joseph et al. | |

(Continued)

OTHER PUBLICATIONS

Hillcrest Communications [Final Edition], Apr. 12, 2004, The Washington Post, p. E 05.*

(Continued)

*Primary Examiner*—Jeffrey A Smith
*Assistant Examiner*—Brandy Zukanovich

(57) ABSTRACT

A method and system are disclosed for increasing the yield of response to an electronic solicitation to take action by presenting direct action links within the solicitation itself. These direct action links are distinguished by the ability to initiate a transaction when a user interacts with them, without the need to search for or access any other web page or site to begin the authorization. The direct action links are themselves updated without requiring the intervention of the user. The increased marketing efficiency is further enhanced by using a software program other than a conventional internet browser or conventional email client to connect with the user. The enhanced program has the capability of storing information about the user of the system for use in authorizing future transactions, the capability of establishing a dedicated communications connection which uniquely identifies the user to another system, and the capability of remembering previous actions taken by the user. Any protocol of secure encryption can be supported in all these communications. On a recurrent basis the user receives media content containing these direct action links, in addition to alerts when new direct action links are available for the user's consideration. With respect to streaming media content these direct action links can be coordinated to the subject of the stream at any moment over time. A business entity, either non-commercial or commercial, can execute the transaction itself, can execute it on behalf of another business entity, or can set a direct action link to transmit the authorization to another business entity for their own execution. A method and system is further described where a server system can coordinate a peer-to-peer network of client systems to distribute the media content containing these direct action links using the bandwidth capacities of the client systems themselves, or with the informed consent of particular users to send other messages through their own outgoing email functions as the sender. The products and services authorized by these transactions can either be fulfilled back through the system used by the user for the communications, or else be delivered or performed by other means.

18 Claims, 3 Drawing Sheets

U.S. PATENT DOCUMENTS

| | | | |
|---|---|---|---|
| 5,960,411 | A | 9/1999 | Hartman et al. |
| 6,026,376 | A | 2/2000 | Kenny |
| 6,029,045 | A | 2/2000 | Picco et al. |
| 6,029,141 | A * | 2/2000 | Bezos et al. .................. 705/27 |
| 6,092,053 | A | 7/2000 | Boesch et al. |
| 6,119,229 | A | 9/2000 | Martinez et al. |
| 6,275,268 | B1 | 8/2001 | Ellis et al. |
| 6,282,713 | B1 | 8/2001 | Kitsukawa et al. |
| 6,330,550 | B1 | 12/2001 | Brisebois et al. |
| 6,341,353 | B1 | 1/2002 | Herman et al. |
| 6,357,043 | B1 | 3/2002 | Ellis et al. |
| 6,378,075 | B1 | 4/2002 | Goldstein et al. |
| 6,446,048 | B1 | 9/2002 | Wells et al. |
| 6,477,508 | B1 | 11/2002 | Lazar et al. |
| 6,484,011 | B1 | 11/2002 | Thompson et al. |
| 6,496,802 | B1 | 12/2002 | van Zoest et al. |
| 6,615,226 | B1 | 9/2003 | Hartman et al. |
| 6,615,408 | B1 | 9/2003 | Kaiser et al. |
| 6,629,079 | B1 | 9/2003 | Spiegel et al. |
| 6,643,624 | B2 | 11/2003 | Philippe et al. |
| 6,671,716 | B1 | 12/2003 | Diedrichsen et al. |
| 6,711,552 | B1 | 3/2004 | Kay et al. |
| 6,725,269 | B1 | 4/2004 | Megiddo |
| 6,771,317 | B2 | 8/2004 | Ellis et al. |
| 6,832,240 | B1 | 12/2004 | Dutta |
| 6,839,677 | B2 | 1/2005 | Mathur et al. |
| 6,850,901 | B1 | 2/2005 | Hunter et al. |
| 6,859,910 | B2 | 2/2005 | Croy |
| 6,862,612 | B1 | 3/2005 | Horn et al. |
| 6,882,981 | B2 | 4/2005 | Philippe et al. |
| 6,907,315 | B1 | 6/2005 | Hartman et al. |
| 6,934,963 | B1 | 8/2005 | Reynolds et al. |
| 6,944,669 | B1 | 9/2005 | Saccocio |
| 6,957,041 | B2 | 10/2005 | Christensen et al. |
| 6,957,334 | B1 | 10/2005 | Goldstein et al. |
| 6,983,311 | B1 | 1/2006 | Haitsuka et al. |
| 6,993,499 | B2 | 1/2006 | Gagnon et al. |
| 7,003,789 | B1 | 2/2006 | Linehan |
| 7,010,500 | B2 | 3/2006 | Aarnio |
| 7,058,817 | B1 | 6/2006 | Ellmore |
| 7,103,908 | B2 | 9/2006 | Tomsen |
| 7,146,341 | B1 | 12/2006 | Light et al. |
| 7,155,405 | B2 | 12/2006 | Petrovich |
| 7,194,754 | B2 | 3/2007 | Tomsen et al. |
| 7,197,475 | B1 * | 3/2007 | Lorenzen et al. .............. 705/26 |
| 7,222,087 | B1 | 5/2007 | Bezos et al. |
| 7,275,685 | B2 | 10/2007 | Gray et al. |
| 7,284,063 | B2 | 10/2007 | Itabashi et al. |
| 7,284,066 | B1 | 10/2007 | Philyaw et al. |
| 7,305,355 | B2 | 12/2007 | Tarvydas et al. |
| 7,313,802 | B1 | 12/2007 | Tomsen |
| 7,315,830 | B1 | 1/2008 | Wirtz et al. |
| 7,328,405 | B1 | 2/2008 | Hyatt et al. |
| 7,334,184 | B1 | 2/2008 | Simons |
| 7,337,956 | B2 | 3/2008 | Gray |
| 7,343,322 | B1 | 3/2008 | Mulderry et al. |
| 7,346,552 | B1 | 3/2008 | Salzinger et al. |
| 7,346,558 | B2 | 3/2008 | Rosenberg |
| 7,346,587 | B2 | 3/2008 | Goldstein et al. |
| 7,353,383 | B2 | 4/2008 | Skingle |
| 7,363,248 | B2 | 4/2008 | Rollins et al. |
| 7,379,901 | B1 | 5/2008 | Philyaw |
| 7,406,659 | B2 | 7/2008 | Klein et al. |
| 7,415,429 | B2 | 8/2008 | Rollins et al. |
| 7,426,530 | B1 | 9/2008 | Rosko et al. |
| 7,475,043 | B2 | 1/2009 | Light et al. |
| 7,493,283 | B1 | 2/2009 | Philyaw |
| 7,500,602 | B2 | 3/2009 | Gray |
| 7,503,480 | B2 | 3/2009 | Barnes et al. |
| 7,533,064 | B1 | 5/2009 | Boesch |
| 7,536,351 | B2 | 5/2009 | Leblang et al. |
| 7,542,942 | B2 | 6/2009 | Peart et al. |
| 7,542,943 | B2 | 6/2009 | Caplan et al. |
| 7,543,738 | B1 | 6/2009 | Saunders et al. |
| 7,565,308 | B1 | 7/2009 | Bollay |
| 7,580,869 | B2 | 8/2009 | Tarvydas et al. |
| 7,599,856 | B2 | 10/2009 | Agrawal et al. |
| 7,627,531 | B2 | 12/2009 | Breck et al. |
| 7,631,072 | B2 | 12/2009 | Allibhoy et al. |
| 2001/0037192 | A1 | 11/2001 | Shimamoto et al. |
| 2002/0049644 | A1 | 4/2002 | Kargman |
| 2002/0065715 | A1 | 5/2002 | Tennyson et al. |
| 2002/0120935 | A1 | 8/2002 | Huber et al. |
| 2002/0143933 | A1 * | 10/2002 | Hind et al. .................. 709/224 |
| 2002/0194604 | A1 * | 12/2002 | Sanchez et al. .............. 725/60 |
| 2002/0199195 | A1 | 12/2002 | Townsend et al. |
| 2003/0101413 | A1 * | 5/2003 | Klein et al. .................. 715/513 |
| 2003/0182195 | A1 | 9/2003 | Kumar |
| 2003/0208442 | A1 | 11/2003 | Cockrill et al. |
| 2003/0233282 | A1 | 12/2003 | Ward et al. |
| 2004/0019532 | A1 | 1/2004 | Waldman |
| 2004/0039781 | A1 * | 2/2004 | LaVallee et al. ............. 709/205 |
| 2004/0168052 | A1 * | 8/2004 | Clisham et al. ............. 713/153 |
| 2004/0172340 | A1 | 9/2004 | Bishop et al. |
| 2005/0015304 | A1 | 1/2005 | Evroni et al. |
| 2005/0044006 | A1 | 2/2005 | Soga et al. |
| 2005/0049933 | A1 | 3/2005 | Upendran et al. |
| 2005/0060748 | A1 | 3/2005 | Berman et al. |
| 2005/0071240 | A1 | 3/2005 | Ewald |
| 2005/0203765 | A1 | 9/2005 | Maritzen et al. |
| 2005/0216354 | A1 | 9/2005 | Bam et al. |
| 2005/0251455 | A1 | 11/2005 | Boesen |
| 2005/0261984 | A1 | 11/2005 | Hutchison et al. |
| 2005/0267813 | A1 | 12/2005 | Monday |
| 2005/0273396 | A1 | 12/2005 | Aliabadi et al. |
| 2005/0273399 | A1 | 12/2005 | Soma et al. |
| 2005/0273820 | A1 | 12/2005 | Elberbaum |
| 2006/0041485 | A1 | 2/2006 | Tarvydas et al. |
| 2006/0106681 | A1 | 5/2006 | Shafron et al. |
| 2006/0122904 | A1 | 6/2006 | Shafron et al. |
| 2006/0149641 | A1 | 7/2006 | Loeb et al. |
| 2006/0150218 | A1 | 7/2006 | Lazar et al. |
| 2006/0184428 | A1 | 8/2006 | Sines et al. |
| 2006/0184431 | A1 | 8/2006 | Rosenberg et al. |
| 2006/0190346 | A1 | 8/2006 | Sines et al. |
| 2006/0224469 | A1 | 10/2006 | Kunz et al. |
| 2006/0235761 | A1 | 10/2006 | Johnson |
| 2006/0242026 | A1 | 10/2006 | Crespo et al. |
| 2007/0005435 | A1 | 1/2007 | Murase et al. |
| 2007/0005450 | A1 | 1/2007 | Krishnamoorthy et al. |
| 2007/0022017 | A1 | 1/2007 | Bhambri et al. |
| 2007/0061222 | A1 | 3/2007 | Allocca et al. |
| 2007/0083439 | A1 | 4/2007 | Petrovich |
| 2007/0150360 | A1 | 6/2007 | Getz |

OTHER PUBLICATIONS http://home.real.com/product/help/rhapv3_gold/en/instruction/musicpurchase-textonly.htm (Real.com purchasing music), printout attached.

http://www.adelphia.com/programguide/on-screen%20source/index.html (Adelphia OnScreen Programming Guide, skip to ONDEMAND), printout attached.

* cited by examiner

INTERACTIVE ELECTRONIC DESKTOP ACTION METHOD AND SYSTEM FOR EXECUTING A TRANSACTION

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office Patent file or records, but otherwise reserves all copyrights whatsoever.

BACKGROUND

The development of the internet has created new avenues for transactions which previously would have taken place in person at a "brick and mortar" establishment, or over the phone or by mail. Central in the development of this new transaction space has been the utilization of the internet browser (initially created to facilitate internet data connections for the non-technical user), a computer software program which may be used by a computer user to actively search web sites for products or information that the user is seeking. Once a person has found what they want at a web site, they can take various actions to initiate transactions to purchase products or information featured there, or to download electronic media content for free if that is an option.

So it is that the great race on the internet has become to establish one's destination as a frequently visited web site, and to build up over time the traffic of your web site much as a radio or TV station or periodical would build up an audience or reader base. To this end there has been on one hand a premium on short, catchy names that hopefully people can remember long enough to enter into their browser location input the next time they have their browser window opened up. Even under the most optimum circumstances this is not an especially efficient way of recruiting visitors, depending as it does on the fleeting memory of the potential customer. The fundamental point of incessantly repeated advertising is to try to imprint this information long enough to make an actual customer connection.

The other main thrust of visitor recruitment, and more effective from a direct action standpoint, is the attempt to proliferate links back to one's web site on as many other web pages as possible. In this way hopefully more people will encounter a reference to one's product or service on other sites they may have come to, resulting in them immediately clicking through to visit your own site. This is most likely to be successful if such links are prominently displayed on high traffic areas of sites with a related theme, but general interest sites with many of their own visitors now sell pricey banner ad space to advertisers of products with broad appeal of their own. Search engines are even tailoring the ads presented on their page to match the profile of what that particular person might be searching for.

But the strength of the browser model, the ability to pursue an infinitely branching search path, is also its weakness from the standpoint of a service or product supplier trying to get the attention of a surfer long enough to complete a transaction. A web visitor can be easily distracted by something else on a web page, or with a single click can go back to some other page they were viewing a moment before. What is most important is that a particular visitor could be anybody, not identified in any meaningful respect on their first visit, except by whatever information the hosting server can read about their browser software version, by a reference to the previous page they might have clicked through from, or by the numerical internet designation number being used by the client system for that connection, which for many surfers is not a fixed identifier.

In short, with each new visitor one is starting from scratch each time in terms of establishing a customer relationship. The various one click models of doing business over the internet depend on a customer first entering the information necessary to complete a financial transaction on some previous visit, and then storing some part of that information at the client end in the form of a browser "cookie," intended as a data storage area that can only be retrieved by the web site that initiated its storage in the first place. The cookie or whatever authorization created on behalf of one web site cannot be used by another even if the customer were so inclined.

It has been easy enough to say, "Come to our web site," but in many cases that is not what would be easiest for the customer. People use their computers for many other kinds of software programs besides their internet browser, and the average computer user does not spend their entire time "surfing" the web. For example, if one is listening to a radio station and hears an ad for a product, even if one is on the computer at the time, one has to start the browser program if it is not already running, enter the web address of the web site mentioned (subject to typographical errors), hunt around for the product ordering page, enter one's address and billing information perhaps over multiple screens, with each step representing potential for distraction, second thoughts of doubt, error, and with it a corresponding loss of yield.

Some tentative steps have been taken away from the browser-based model by some of the internet streaming media services. In these cases a standalone media player has been combined with the option of downloading for a price a possession or one time experience copy of the electronic content the user wishes to access, or to sell other similar content based on a preview or reference to an upcoming event. So it is that music tracks can be purchased through a music player, video content can be purchased by a video player, and so on. But it is still the duty of the user to actively search the interface for the content they think they might want to purchase. And even according to those models there has been no anticipation that other products and services of a different character than the media streams themselves might be delivered based on selections from the media player interface.

In light of the foregoing, it is respectfully submitted that a broader non-browser model for the processing of electronic transactions has the greater future potential as a way of doing business. Such a model offers more than a singular advantage. In the first instance, a dedicated piece of resident software with its own internet communication capabilities can be configured to always be definitively identified according to its user by a server system function it contacts.

Second, with no limitation on its custom capabilities, billing information can be stored for the instantaneous at will use of the user of the client system as to any product or service the server system might make available. Third, the server system can on its own initiative, on that of the client, or on some periodic basis, transmit interactive media content for display to the user, instead of just passively waiting for visitors, thereby synchronizing direct action functions to immediately place orders for the referenced products or services. Additionally, the software can always still interface and connect back through the default resident browser itself.

This disclosure teaches how to construct new models of user friendly relationships with novel methods of operation as outlined above, and with further advantageous aspects to integrate the process of product and service fulfillment in ways not previously possible. In this way the connectivity of the internet can be harnessed to more efficiently deliver the products and services people want in their daily lives. And in doing so, a software application can claim for itself territory on the user computer display screen now being left to the winds of random whim or the chance of a search result.

SUMMARY

The present invention is directed to fulfilling the potential of the new medium of the internet. A method and system are disclosed where a client system, either fixed by a wired network connection or mobile, first establishes a path of electronic communication between itself and a server system, most optimally using a custom software program dedicated for this purpose. In making this connection, the client system identifies itself in a unique way to the server system. As part of this established relationship the client system receives media content on a recurrent basis from the server system. This can take the form of updates to the program interface and its contents, active alerts, advertising offers, or any other modification of the content presented by the program interface. The delivery of updates from the server system can be either driven unilaterally by the server system at its own recurrent discretion, or the server system can be polled periodically by the client system under the control of the software provided by the server system. The client system can also be empowered, but not required, to request at its own initiative updates of the program interface by way of refresh or search functions as a fallback.

Incorporated into the media content supplied by the server are functions for the client system to take direct action with respect to that content. This action may include placing orders for items both tangible and intangible, to upgrade the software version of the program, or simply to generate communications in the form of messages. If billing information or contact information is required, it can be submitted on a one time basis, or for convenience stored at the client or server end for subsequent repeated use, with security measures enabled by customization of the software itself. The action can be then be fulfilled either by delivery of media content directly back through the client interface, or by some outside means, as by mail delivery or by the placement of an order for action by an external system. In addition, the direct action options provided by the server system may include proxy order taking for third party merchants and service providers, or submission of computer user contact or billing information to them directly via additional communication pathways, dedicated or not. In the case of streaming media content the direct action functions can reflect the subject of the content stream at that moment.

DETAILED DESCRIPTION

Figure 1:
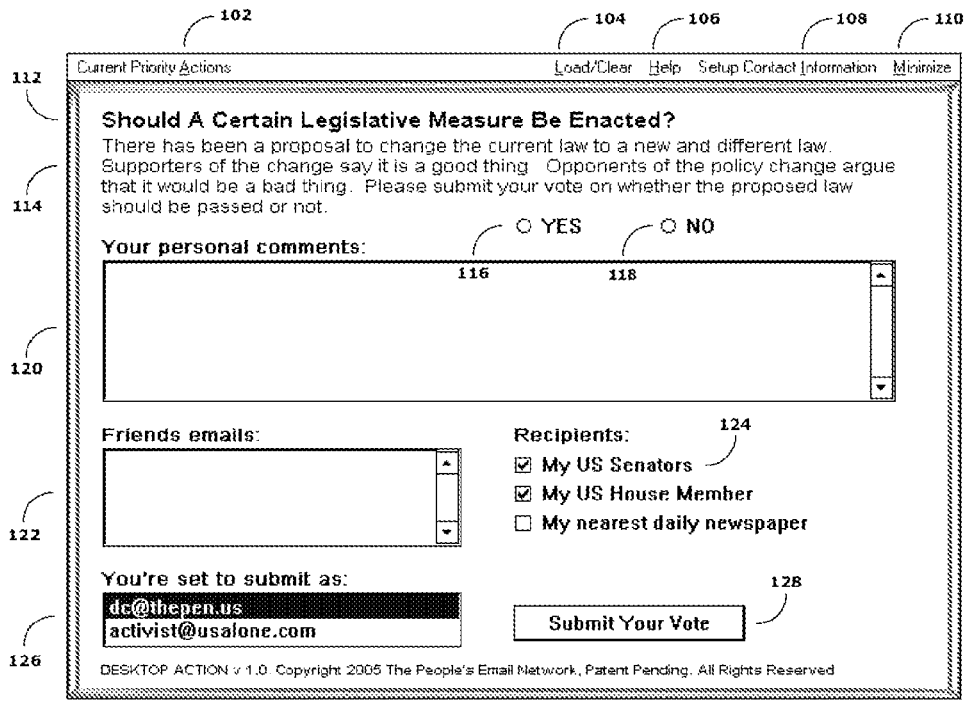
FIG. 1 is a screen shot of a sample embodiment of the present invention applied as a political message referendum, showing a typical generic action page as the application would appear in the program interface when not minimized.

Some preliminary definitions will facilitate an understanding of the various novel aspects of the instant invention. A "networked electronic terminal" is any computer or other electronic appliance with a computer display screen or other data output function, connected electronically to at least one other computer for exchange of data. A "server system" is a host computer which provides data contents for a networked electronic terminal with which it communicates, and determines thereby the functioning of those contents. In this context, the networked electronic terminal is known as the "client system," with a person interacting on the client system being the "user." The "program interface" is the apparent appearance or other perception of a software program (also referred to as an "application"), including its pages, menus and submenu, on the computer display screen of the client system, through its audio speaker, or any other output device it may have configured to communicate with the user. An "End User License Agreement" or "EULA" is the statement of the terms and conditions that the user would agree to in order to be granted permission to use the program.

A "conventional internet browser" is a software program with the general ability to access any data resource available by an internet URL designation (commonly known as a "page address"), not inherently dedicated in any part to communicate with any particular internet address, with the ability to store and retrieve "state information" and user identity information currently limited to the use of "cookies." A "conventional email client" is a software program used for reading email messages, which may also be able to display internet web pages including links to other internet web pages, but which is subject to at least the same limitations as a conventional internet browser as far as the storage and retrieval of state information or user information, other than their return email address "From" field, and which otherwise cannot uniquely identify the user. Obviously, if a piece of browser or email client software were to be given the additional capabilities disclosed herein, it would not longer be "conventional" as defined, and would instead incorporate features of the instant invention itself.

"State information" is data input or status that the program can remember and resubmit at the time of a later internet connection, which for an application at the operating system level other than a conventional internet browser would include the methods of using entries in the system registry (as it is called in a Windows system) or reading and writing hard drive files. For a conventional internet browser this would not need to include the numerical IP address of the client system or information about the operating system or browser software, the port being used, or any other information which would be included in the headers already in usage for HTTP requests. A "port" is one of a multiple number of assigned numerical destinations within itself that a server system or client system may use for different classes or communication, or for simultaneous communication with multiple other systems. An HTTP request is an access of a server system by another system, with the headers constituting routing information, parameters of form inputs being submitted, and information about the software configuration of the requesting system. The server then delivers an HTTP response with its own parallel headers, together with any other data formatted by the server system pursuant to the request. "Cookies" are data collections stored at the client system end that a server system can ask the client system to read, so that the information contained therein can be included by the client system in an HTTP request.

An "icon" is a small sized computer graphic, symbolizing a computer application or function, which can be accessed or activated by clicking on that icon symbol by way of a shortcut. The "desktop" is the graphic appearance of the computer operating system itself, with no other application windows open, an "application window" being the usually rectangular appearance of the graphic interface for a software program opened for use, which would constitute part of the program interface. Included on the desktop will be found groups of icons according to type, with frequently used software applications in the main area of the system display screen, and in other specialty areas like the "system tray" where certain preferred utilities can be instantly accessed.

An "identifiable connected relationship" is one where the server system can determine a unique identity for a client system that is communicating electronically. This can be established by the exchange of authorization data, or by the definitive and permanent association of the client system with some addressable digital number such as a fixed numerical IP address, or some internal system designator in the context of a private communications network. The server system would either maintain stored user information associated with that unique identity, or the client system would transmit it incorporated into its communications with the server system. Multiple persons can share a unique user identity if they mutually so authorize each other. "Media content" would be any manner of data transmittable electronically, including text, pictures, digitized audio and video, or any anything else that can be presented by the program interface, "presenting" meaning to manifest a perceptible change in the program interface. "Streaming media content" specifically refers to audio and video signals and the like, which require the continuous delivery of new data over time to maintain the presentation of that audio or video. "Recurrently" means to perform an action at least one subsequent time for any particular running instance of the program.

A "link" is a feature of the program interface that causes the program to take an action when that feature is interacted with, for example to open up another page or initiate a communication over the internet. A "direct action function" is a link which when interacted with definitively delineates the commencement of the authorization process of a particular transaction, where that "transaction" could be the placing of an order to obtain a product or service, an inquiry about that particular product or service, or the affirmative act of sending of some other kind of message. The interaction need not be with a graphic element, and could be an audio alert and a vocal response. If the client system is storing user contact or billing information for authorization use that would be accessed by the direct action function as part of this process. A direct action function need not necessarily be one that requires only a single action to trigger its fulfillment. It only requires that it represents the first step of the definitive commitment or decision to take the action, whereupon the client system formats and transmits, to the target of the direct action function, user information representing some part of the authorization process required to execute the transaction, for which the identifiable connected relationship might be a sufficient part.

"Execute" means taking those steps subsequent to the authorization of the user necessary to put in motion the fulfillment of a transaction, "fulfillment" being the final delivery of the product or performance of the service which is the object of the transaction. The "target" of the direct action function is the server system where the client system is directed to fulfill the execution of the transaction. If the transaction is to be executed by a server system other than the initial target then they become the target as the responsibility for the execution is transferred to them. User "intervention" means an action to search, refresh or otherwise navigate the program interface.

As a first example embodiment of the instant invention we will describe an implementation of a non-commercial system for sending personal messages, FIG. 1, 120, to political policy makers, though as will be seen later in this specification, commercial applications of this technology are of equivalent if not greater importance. This inventor has already described a method of using an internet web page to provide such political messaging services in patent application Ser. No. 11/184,595, filed Jul. 19, 2005 (and its predecessor Provisional Patent Application 60/589244), currently pending. The additional advantages of using the method of this invention in that context will now be demonstrated. In this context the instant invention is acting as a front end interface for the pending '595 invention.

Figure 3:
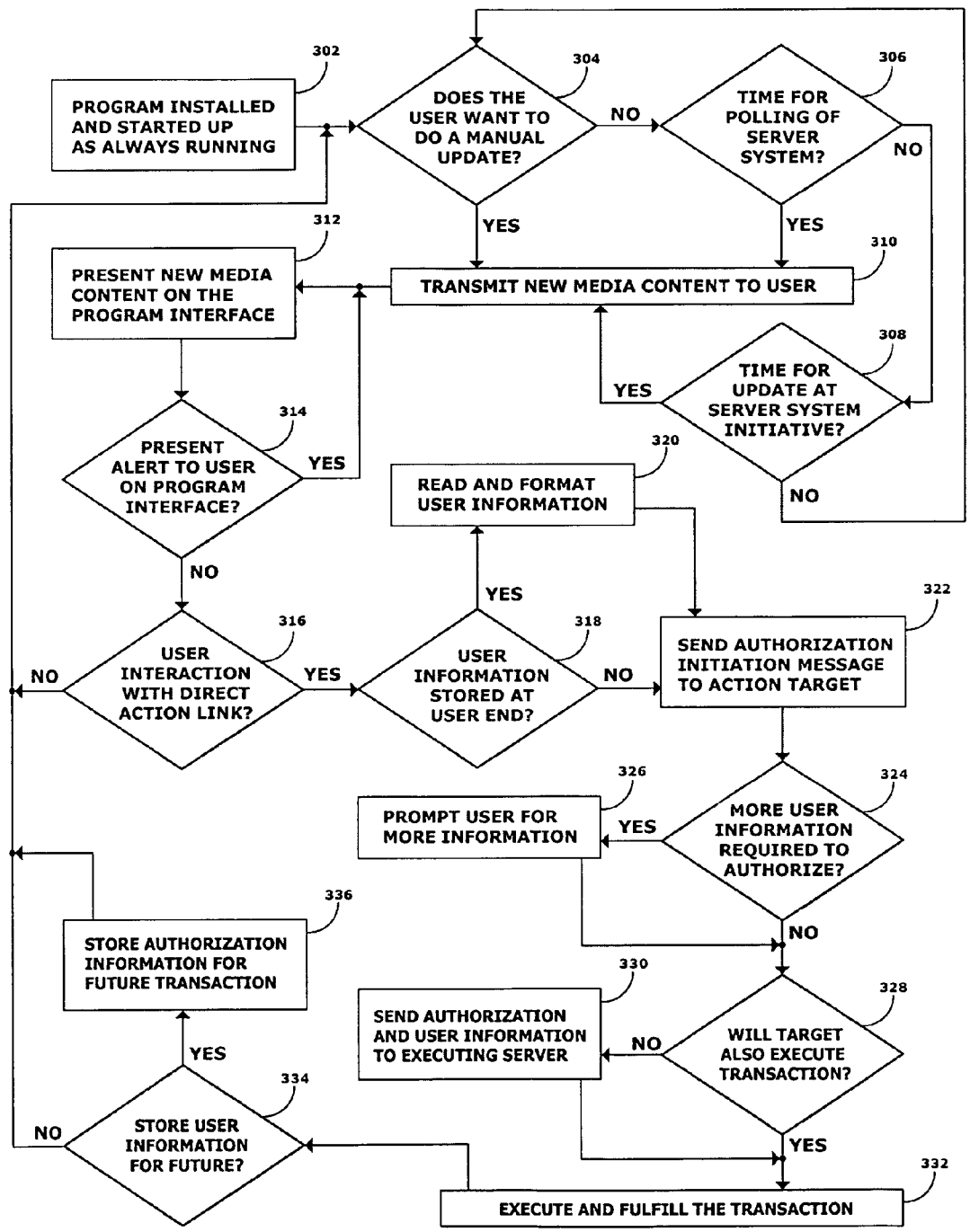
FIG. 3 is a flow diagram illustrating the steps performed in transmitting media content to the client system from the server system, and in responding to the user interacting with the direct action functions represented by the media content so as to execute a transaction.

On client system startup, the software in this embodiment loads as an always running application, 302 of FIG. 3, minimized in this case to the system tray. Virtually all applications have the option of being reduced to some kind of icon if not actually shutdown, and here the system tray is a convenient always visible area of the operating system desktop that naturally includes other quick access icons. Though the application shown is described using the designations of a Windows application, Macintosh and all other operating systems with graphic interfaces have parallel features. All one has to do is click on the icon and the application is displayed instantly, as in FIG. 1. This is already a large improvement over any previous method, which would require the user to open up their internet browser, probably having first taken the time to open and read perhaps an email alerting to the availability of any action on a particular issue.

FIG. 1, shows one of a series of action pages that can be selected from the "Current Priority Actions" pull down submenu, 102. This one is a submission form that enables a client system to transmit a vote, Yes or No, by the selection of radio buttons 116 and 118, on a policy question at issue, 112, to the target recipients they may select with checkboxes 124. At the same time they may enter the email addresses of any friends, 126, they might also like to invite to weigh in on this question, who then receive alerts by regular email if they do not already have the software installed themselves. These alerts can be sent by the server system or with the consent of the client system sent through its own connection resources.

After the program is installed and started up, 302 of FIG. 3, the server system can update program interface, FIG. 1, including the pull down submenu, 102, on the server system's own recurrent initiative, 308 of FIG. 3, or on a periodic polling basis driven as configured into the software application itself, 306 of FIG. 3. Either way, as new issues of pressing urgency arise that would require constituent input, the server can automatically update and populate the menu with new selections, setting the application to start with the topmost menu selection, which in this case was the generic issue represented on this page. Because we have chosen to employ a custom application in this embodiment, we can make it do anything we like, as in here turning the first visible frame of the program interface and its menu selections into something dynamic.

Though internet communication for the purposes of compatible browser usage has been standardized to a limited set of common header types and content types, by entering the non-browser realm the server application can send the application whatever custom headers and raw data it may choose, formatted any way it likes for its own purposes, just as long as the request and response meet the minimum requirements of one of the internet communication protocols, in this case HTTP. In the case of a privately dedicated electronic communication system we escape even this last limitation. The communications can include a unique identifier associated with a particular installation of the application which the client system uses in exchanging messages with the server system, elements of contact information and encrypted digital keys. When the application receives an interface update communication from the server, it either instantly changes the topmost page of the program interface and updates the selections of its action selection submenu, 102 of FIG. 1, to correspond, or else stores those changes for display later. The update communication can include the text for particular questions at issue, 112, and additional expository text, 114, specifications of what the available selection of recipients will be for the particular questions, together with any other ancillary data such as an identifying number for the action and a link to a sibling action page on an internet web server (for use in the friends emails).

If a network listening function (referred to as "opening a port") is provided for in the application, the server system needs only to initiate the communication with no predecessor request from the client system being required, 308 of FIG. 3. To do so one skilled in the art would create a function where the client system would monitor for any communication access to a particular designated numerical port within itself, as accessed from the internet or other electronic network. Upon such event, and knowing from that (and probably together with the exchange of an authorization sequence for security purposes), that it is an incoming update communication from the server system, the client system can then interpret and process the data transmitted by the server system, 310 of FIG. 3. If it is not critical that the program interface be updated on a moments notice, the program software can periodically poll the server system to see if there is a pending update, 306 of FIG. 3. The advantage of the latter approach is it would make it that much more difficult for a malicious hacker to try to crack the authorization and gain access to this function, but adequate security can be provided with methods of encryption available to one skilled in the art. One would also be constrained to use a polling method where a client system had an internet connection with a non-fixed numerical IP address, as is the case for many residential users.

Generally the new media content would be presented on the program interface as soon as received by the client system, 312 of FIG. 3. But for this particular embodiment, whether the update is done unilaterally by server system, 308 of FIG. 3, or in response to a client system poll, 306 of FIG. 3, we might prefer not have this event take place while the application was in a non-minimized display state. For example the user might be drafting a personal message of considerable length at that moment and might not like the question to sudden change before him. In this case the client system can signal to the server system that it is working and the update communication can be tried again, or the data could be stored in the application, with the current page being maintained in the interim. One skilled in the art would exercise their design preference in this regard. In this embodiment we chose to set a timer to automatically minimize the application after a modest period of non-activity (no input field changes or menu selection events) and simply tell the server system to try later. At the same time there is provided in the pull down submenu, 102 of FIG. 1, a selection where the user can update the menu on their initiative while working on the application, 304 of FIG. 3. Or the user can to minimize the application anytime by menu selection "Minimize," 110 of FIG. 1.

As a further example of the advantage over a conventional internet browser of adopting a custom application for the method of this invention, when the user submits a vote on particular question the menu selection can be placed in a "grayed" disabled state. This both prevents duplicate votes by the same person, it allows them to see at a glance what issues they have already submitted on, a desirable convenience feature. Other user friendly features are seen also in the submenu "Load/Clear," 104 of FIG. 1, which in this embodiment includes functions to save one's comments as a text file, and to load email addresses into the friends input field, 122, from either a text file or the client user's address book. This latter function is something that would only be available directly to a program with operating system level access.

Under the "Help" submenu, 106 of FIG. 1, may appear links to various pages to answer questions or provide instruction by paged within the application itself, or these may take the form of functions that open up web pages over the internet or to initiate an email communication using the client's default email application. There is also a function to reset the network connection of the program itself if there were to be some communication failure by the server system, the client system, or on the internet or other electronic network itself. To one skilled in the art all these things are facile in a custom application as this, together with whatever other such features on might like to incorporate, of which the foregoing are merely representative examples.

Figure 2:
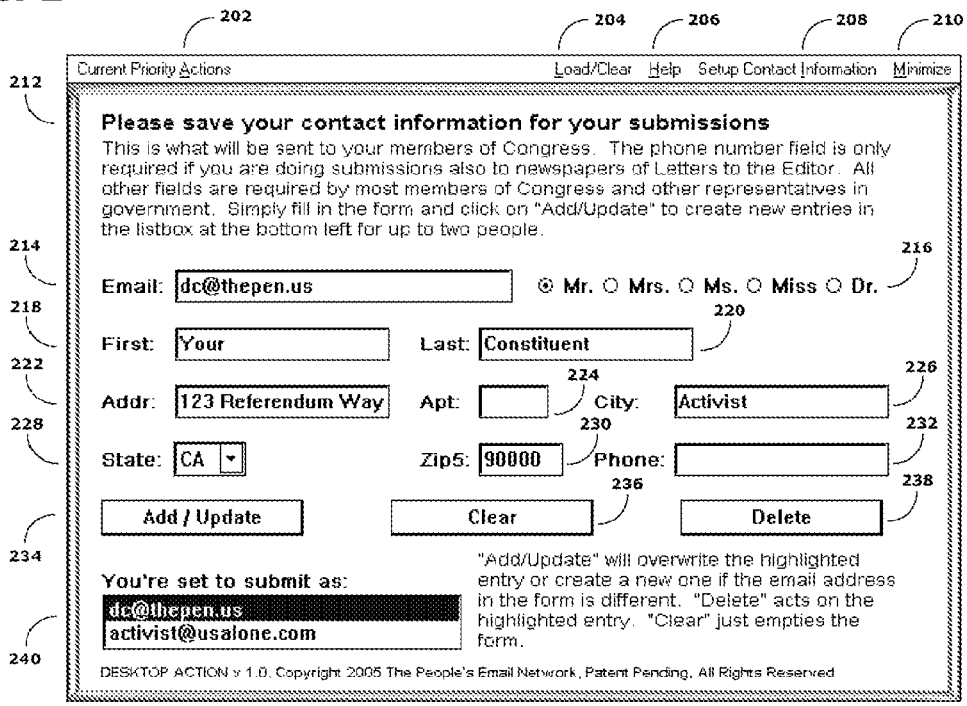
FIG. 2 is a screen shot of a sample embodiment of the present invention applied as a the same political message referendum, showing a typical user contact information setup page.

For the additional convenience of the user, we have provided that they need only enter their contact information one time through the function "Setup Contact Information," 108 of FIG. 1, which would then open up the page represented by FIG. 2 in this example. Here we have provided for up to two user identity profiles to be created, as for example two family members who use the same computer and would want to vote individually, though this might be any number in this instance subject to the concern of making it too easy for one person to pretend they were multiple people at the same time. This of course could also be detected by the server system monitoring the activity of the particular identifiable connection associated with this installation of the software. The input fields here, 214, 216, 218, 220, 222, 224, 226, 228, 230 and 232, represent the various items of constituent contact information required by most members of Congress to accept a message submission. Once a profile is created with the "Add/Update" button, 234, an entry appears in the listbox, 240, and this same listbox appears on the action pages as well, as in 126 of FIG. 1, to allow the user to easily set their identity, something no cookie could do without logging into the computer itself as a different person. Functions are also provided in this example to clear the form fields, 236 of FIG. 2, or to delete a user contract information profile entirely, 238.

When the action page is submitted, 128 of FIG. 1 and 316 of FIG. 3, it transmits the form data to the target server system, 322 of FIG. 3, including the stored state information of the user contact information, 318 and 320 of FIG. 3, and the information as to which question the client is voting on, where it can be piped into the same server routines that would handle the submission from a regular web page form submission under the pending '595 invention. That is all that is required for this embodiment, but if more information were required to authorize the transaction, for example additional information for billing, the target server system would now prompt for it, 324 and 326 of FIG. 3. At the same time the server system can report the submission results back to the client system for display on a page there, 328 and 332 of FIG. 3. There is no fundamental reason why the action pages in this political message example could not be in the form of petitions, with a predetermined policy position and no voting option, though one might think the application would be more welcome to the user if it allowed for differences of opinion, as is the case here.

When the server system does a content update, 310 of FIG. 3, it can at the same time include a data message to turn on an alert function to let the client know that there are new questions available in the menu, 314 of FIG. 3. Since we are already using an icon for the program in the system tray area of the computer desktop, in this embodiment a graphic of a black ink bottle, we can direct the software to begin a cycle of swapping the icon for another, perhaps a red ink bottle graphic, creating a gentle but attention drawing flashing animation effect. In a like matter one skilled in the art might choose an audio alert or some other signal for one of the other senses of perception. This represents yet further improvements on previous methods where one might send out an email alert to rally activists to an internet web page, as by sending them an email alert. People may not always be reading their email, but using the method of this invention, if they are on the computer at all, with a single click the highest priority action page instantly appears, where with preconfigured contact information a vote can be submitted with the minimal expense of user time and effort.

Another significant advantage is that by the method of this invention we have created our own lines of communication, a dedicated conduit not dependent of the vagaries of email communication where large scale mailings are discriminated against by the email service provider filters, either refusing the acceptance of messages altogether, or relegating them to designated junk compartments of the email client. Such messages may be deleted wholesale and never even read, lost in a proliferation of unwanted, unsolicited and unauthorized other messages. While an internet service provider for the client system might conceivably attempt to perversely block all internet communications, not just email, between the client system and the server system, this would be much more easily confronted as a gross violation of the First Amendment. This would be definitively detectable as the server system would either stop receiving polling requests from the client, or else would not be able to access the program from its own end. It might otherwise be indicative of the program being shutdown or removed, but if there were a pattern as to a particular internet service provider, this would be diagnostic.

One skilled in the art might configure any manner of additional messages to be carried by a recurrent update transmission from the server system, including pure text messages, which may also include links to other sites, requests for donations still within the scope of a non-commercial enterprise, and notifications that a new version of the software is available. In the latter case the content displayed on the program interface may include a revised EULA, highlighting the new functions and features of the new version, together with a button to immediately download and install the new software from the server system, and constituting a program upgrade transaction. The client system can include in its transmissions to the server system the current software version so that the server system knows who to alert in this regard, and the server can track by client identifier who has been alerted as to what other matters, so that alert messages included in update communications are not unduly duplicative.

Cosmetic updates might not require additional consent, but major new capabilities certainly should and these are anticipated as well. The ultimate power of the method of this invention lies in the fact that what we have created here is a resident and dedicated communications outpost, prominently featured on the client system. From this foothold greatly expanded capabilities can be installed subject to the client's consensual approval. It would be relatively easy for one skilled in the art to add for example a radio channel to the interface, featuring news and content of a political nature, as appropriate to this particular embodiment. Not limited to anyone else's predetermined audio player protocol, these transmissions could carry not just audio data, but information to update the program interface concurrent with the audio content. As a suggested utilization of this method of the invention, suppose an announcer were to ask those listening to take a particular action on the spot. A message page or other direct action option could simultaneously appear in the program interface whereby a person could take that immediate action, not just to submit a voting page as already described, but perhaps to even provide a link to connect to some internet web site, or even make a phone call.

Still speaking of an add-on audio reception function, one skilled in the art could also configure all available installations of the software Menu items 202, 204, 206, 208 and 210 are simply the identical menu items to FIGS. 1, 102, 104, 106, 108 and 110, the operation of which within the software has already been fully described. And directly akin to 112, we show FIG. 2, 212 which are simply text instructions for this display page of the software, repeated now here again in essence as follows as a peer-to-peer distribution network. Remembering that the custom application may have whatever operational features we desire, we might direct one client to communicate with others to propagate the data packets of an audio stream and share them with other clients in an ever branching and expanding distribution structure. More and more computer users are acquiring systems with DSL and cable connections with more bandwidth capacity than they will ever need. In such a scheme a server system could with a relatively small bandwidth load of its own create a vast radio network where the client systems provide most of the bandwidth power themselves. One skilled in the art would provide a way for a client system to be redirected to another intermediary client system should its current connection momentarily fail.

In the political context there may be super activists who want to get involved in doing aggressive outreach of their own. Whereas it is increasingly difficult for a central server system to send out large numbers of email messages directly, with the informed consent of a super class of users the central server could delegate batches of emails to solicit new participants to the system to be sent by individual client systems, accessing their own resident email transmission functions at the operating system level. Even the most restrictive email providers will allow their users to send perhaps a hundred messages a day, which would add up over time and over a quantity of such users to a large collective outreach initiative. In the political speech context this would be very difficult to impede without actionable First Amendment causes of action. Alternatively, a person might just want a convenient way to send their own custom alerts to all the people in their address book though their own email client, and one skilled in the art could certainly provide this feature as well.

Commercial Applications

Figure 4:
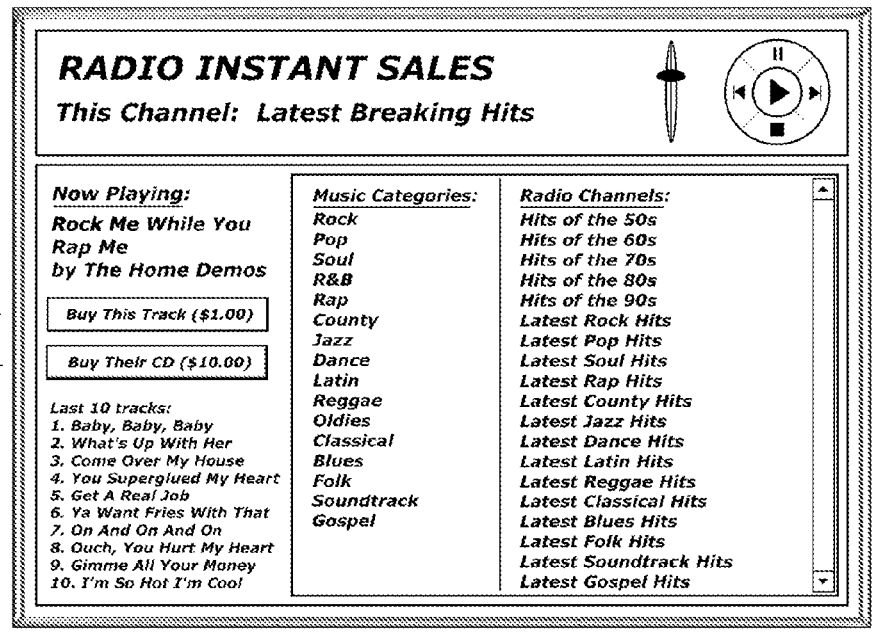
FIG. 4 is a screen shot of another sample embodiment of the present invention applied as a music radio application, showing how a direct action function to order the current playing selection might be concurrently presented on the program interface.

The foregoing highlights some of the novel possibilities enabled by the method of this invention primarily in one particular non-commercial embodiment to mobilize political speech. But the possibilities for commercial speech are perhaps even more dramatic. Returning to the concept of a radio type audio feed, imagine if you will a music channel using a custom program interface according to the method of this invention as already described. As it is currently done, the user is presented with a static music guide, and invited to hunt around for what they want. But in this embodiment when a new song begins playing, 402 of FIG. 4, at the same time a direct action function appears in the currently visible program interface to buy that music track, 404 of FIG. 4, or the album containing it, 406 or FIG. 4. In this way, if something catches someone's ear, they have an instant route to acquire it. Were advertisements for other products to be heard through the radio channel, these could also be coordinated to real time direct action links in the program interface.

For the purpose of fulfilling the order transaction one skilled in the art could store billing information either at the client system end or at the server system, end, associated with that particular user, 334 and 336 of FIG. 3. There are security arguments to be made as to both approaches. Breaches of server system security would be more harmful if large quantities of user billing information were stored in one place and this would be a special consideration, but nothing more than any other financial processing institution would be responsible for. Storage of billing information at the client system end would probably be disfavored in that non-technical computer users may be less wary about security breaches, prone as some may still be to opening up suspicious email attachments and the like, thereby potentially exposing any data stored in their system. One would think that since the server system must always receive the billing information, the obligation of adequate security is at that end already. But even if the interface was to require entry of billing information each time, simply employing the power of the method of this invention to pre-populate contact information in various forms would alone be an increase in convenience and efficiency.

With adequately robust security provisions, the advantage of storing contact and billing information for recurrent use is that one is thereby creating a built-in customer user base for any future transactions. Consider an advertiser of any product or service who might want to promote it on such a radio network. Using the simultaneous direct action link display method already described, one might provide a link to the advertiser's web site to execute the transaction while the user is still listening to the ad. In this case the advertiser's server system might be the target of the direct action function. When the user clicks on such a link, the custom application can configure the client system to advertiser communication to include any of the user information previously stored in the same way as with the server system. Such a custom configuration could include any of the most sophisticated encryption and security features that two highly secured server systems might employ in communicating with each other, including encrypted billing information.

If the server system were to also handle part of the transaction on an affiliate or proxy basis, 330 of FIG. 3, that also would have special advantages for the advertiser. Using the method of the instant invention, one would expect increases in the direct response yield to their advertisements. It would be a valuable selling point in getting the advertiser to place the ad in the first place that the system itself has its own customer user base with authorized billing information already on file, ready to buy the advertiser's product right away through the convenience of the program interface of the instant invention. One would think an advertiser would be delighted to reap the enhanced yields delivered by the method of this invention in exchange for a fair and commensurate commission, even with the advertiser taking all responsibility for fulfilment of the order, though the server system might do that as well and integrate an additional service charge for that.

In a like manner the method of this invention could be applied also to video streams by one skilled in the art. As greater bandwidth becomes available to home users this could be done using peer-to-peer distribution. as with the method for the radio model, through a regular computer system which many users are using to watch video content already. But even more potential would derive from converting existing cable television networks to incorporate the methods of this invention.

Currently such cable TV systems may include the ability to purchase on demand programming, if the client is motivated to search for what is available for purchase in the cable system's online program guide, as contrasted with the dynamic direct action functions disclosed herein. But they do not customize content according to the particular customer except at the customer's initiative. They may call themselves interactive, but they do not take the initiative to interact with you. They are not configured to store, retrieve and transmit state information except where there is an associated conventional internet browser with standard cookie functions. They do not provide for the submission of additional contact or billing information except by that same route. And they certainly don't have the capability to execute transactions at all for any products except their own video programming for themselves or any advertiser.

Figure 5:
FIG. 5 is a screen shot of another sample embodiment of the present invention applied as a home shopping channel, showing how a direct action function to order the currently featured item might be concurrently presented on the program interface.

Using the method of the instant invention, one skilled in the art could configure a home shopping channel where one would not have to place a phone call to order a product, 502 of FIG. 5, but could instead click on an interactive direct action function of the screen itself, 504 of FIG. 5, to use billing and contact information on file, 506 of FIG. 5, just as in the examples already given. Again, this need not be a single action function, and it might even be more desirable to incorporate an interceding confirmation step. All kinds of TV advertisements could in the same way be coordinated with direct action buttons to purchase those products too, as in the radio example disclosed above. This opens the door to commerce of all kinds not limited to buying audio or video streams of the same nature as the media of the client interface itself. Products could include downloadable software programs or any other tangible or intangible products advertised now or in the future. Recognizing that the greatest hurdle in advertising is getting your customer to remember how to obtain the product long enough to act on doing so, the method of this invention offers the promise of unprecedented marketing efficiency 508 of FIG. 5 shows a function for logging out, where there are multiple profiles associated with a single connection, another example of which has already been described as 240 of FIG. 2.

Neither is the method of this invention limited to hard wired communication devices. Not just the initial political referendum model described, but all these other kinds of implementations could be embodied in mobile devices as well. Products could be advertised and ordered by cell phone going far beyond the 900 type services that might be accessed through such a device now. Remote terminals that now only function as email message relays or implementations of conventional internet browsers could incorporate all the functions described in this disclosure the same way.

CONCLUSION

All the features disclosed in this specification (including any accompanying claims, abstract and drawings) may be replaced by alternative features serving the same, equivalent or similar purpose, unless expressly stated otherwise. It is expressly understood that each feature disclosed is one example only of a generic series of equivalent or similar features. Any element in a claim that does not explicitly state "means for" performing a specified function, or "step for" performing a specific function, is not to be interpreted as a "means" or "step" clause as specified in 35 U.S.C. §112, ¶ 6. In particular, the use of "step of" in the claims is not intended to invoke the provisions of 35 U.S.C. §112.

Taken together the methods and system of this invention constitute a new integrated business model to realize the true ultimate potential of electronic connectivity, linking all electronic communication devices into a seamless platform for doing business, and creating for those applying this technology a captive customer user base with which to do that business. We have described here a system of instant response advertising in a brave new world of free form consumer choices. In the same way that it took a while for television to do more than emulate content from the media which preceded it, movies, newsreels and theater of various kinds, so it is time now for the internet, and all the various new hardware and software possibilities it has enabled, to liberate its imagination from the limitations of the past devices, and put the client customer directly in touch with exactly what they want exactly when they want it. If the method of this invention can enable and inspire all that in the hearts and minds of those skilled in the art, it will have been a success indeed.

The invention claimed is:

1. A method of executing a transaction by a first client system, the method comprising:
   (a) a first client system establishing an identifiable connected relationship with a first server system,
      (1) wherein the identifiable connected relationship is established by a dedicated software program,
      (2) wherein the dedicated software program uniquely identifies the first client system running the dedicated software program using a fixed unique identifier,
      (3) wherein user information is associated with the unique identifier, the user information representing at least in part authorization information required to execute the transaction;
   (b) communicating the fixed unique identifier to the first server system as state information, wherein the state information is information remembered by the dedicated software program and includes at least system information;
   (c) receiving the fixed unique identifier communicated as state information, transmitting media content by the first server system to the first client system, the media content including a plurality of direct action functions;
   (d) selecting at least one of the plurality of direct action functions to initiate the transaction;
   (e) in response to the selection of at least one of the plurality of direct action functions, determining whether the first server system or a server system other than the first server system is a target of the direct action function;
      (1) in response to determining that the first server system is the target of the direct action function:
         (ii) providing any additional information required to authorize the execution of the transaction, and
         (iii) directing the execution of the transaction by the first server system;
      (2) in response to determining that a server system other than the first server system is the target of the direct action function:
         (i) directing the first client system to the server system other than the first server system;
         (ii) formatting and transmitting the user information by the first client system to the server system other than the first server system;
         (iii) providing any additional information required by the server system other than the first server system to authorize the execution of the transaction;
         (iv) directing the execution of the transaction by the server system other than the first server system.

2. The method of claim 1, further comprising presenting at least one of the direct action functions on an immediately perceptible part of the client system.

3. The method of claim 1, further comprising the first server system alerting the user of the first client system that there is new media content available from it.

4. The method of claim 1, further comprising storing information about a plurality of users of the first client system for use in authorizing a plurality of future transactions by those users.

5. The method of claim 1, further comprising the first server system executing some part of the transaction on behalf of a second server system representing a different business entity than the first server system.

6. The method of claim 1, further comprising:
   (a) wherein the media content from the first server system is distributed through a peer-to-peer network of a plurality of first client systems,
   (b) the peer-to-peer network being coordinated under the control of the first server system.

7. The method of claim 1, further comprising:
   (a) wherein the media content is streaming media content,
   (b) coordinating the plurality of direct action functions with the subject of the streaming media content over time
   (c) the media content to be transmitted recurrently, without requiring the intervention of the user of the first client system.

8. The method of claim 1, further comprising:
   (a) wherein the transaction is for the first client system to send messages to a plurality of second client systems,
   (b) using the computer resources of the first client system consenting to be the source thereof to send those messages.

9. The method of claim 1, wherein the ultimate fulfillment of the transaction is performed specifically by some means other than delivery of media content back through the first client system.

10. A system for executing a transaction, the system comprising:
   a first client system;
   a first server system;
   at least one server system other than the first server system;
   the system configured to perform a method comprising:
   (a) the first client system establishing an identifiable connected relationship with the first server system,
      (1) wherein the identifiable connected relationship is established by a dedicated software program, (2) wherein the dedicated software program uniquely identifies the first client system running the dedicated software program using a fixed unique identifier, (3) wherein user information is associated with the unique identifier, the user information representing at least in part authorization information required to execute the transaction;

(b) communicating the fixed unique identifier to the first server system as state information, wherein the state information is information remembered by the dedicated software program and includes at least system information;

(c) receiving the fixed unique identifier communicated as state information, transmitting media content by the first server system to the first client system, the media content including a plurality of direct action functions;

(d) selecting at least one of the plurality of direct action functions to initiate the transaction;

(e) in response to the selection of at least one of the plurality of direct action functions, determining whether the first server system or the at least one server system other than the first server system is a target of the direct action function;

(1) in response to determining that the first server system is the target of the direct action function:

(ii) providing any additional information required to authorize the execution of the transaction, and (iii) directing the execution of the transaction by the first server system;

(2) in response to determining that at least one server system other than the first server system is the target of the direct action function:

(i) directing the first client system to the at least one server system other than the first server system;

(ii) formatting and transmitting the user information by the first client system to the at least one server system other than the first server system;

(iii) providing any additional information required by the at least one server system other than the first server system to authorize the execution of the transaction;

(iv) directing the execution the transaction by the at least one server system other than the first server system.

11. The system of claim 10, further comprising presenting at least one of the direct action functions on an immediately perceptible part of the first client system.

12. The system of claim 10, further comprising the first server system alerting the user of the first client system that there is new media content available from it.

13. The system of claim 10, further comprising storing information about a plurality of users of the first client system for use in authorizing a plurality of future transactions by those users.

14. The system of claim 10, further comprising:

(a) an affiliated server system representing a different business entity than the first server system, (b) the target server system executing some part of the transaction on behalf of the affiliated server system.

15. The system of claim 10, further comprising:

(a) a peer-to-peer network of a plurality of first client systems, (b) the first server system coordinating under its control the peer-to-peer network, (c) the peer-to-peer network to distributing the media content from the first server system.

16. The system of claim 10, further comprising:

(a) wherein the media content is streaming media content, (b) coordinating the plurality of direct action functions with the subject of the streaming media content over time, (c) the media content to be transmitted recurrently, without requiring the intervention of the user of the first client system.

17. The system of claim 10, further comprising:

(a) wherein the transaction is for the first client system to send messages to a plurality of second client systems, (b) the computer resources of the first client system to be used as the source for sending those messages, with the consent of the first client system.

18. The system of claim 10, wherein the ultimate fulfillment of the transaction is performed specifically by some means other than delivery of media content back through the first client system.

* * * * *